United States Patent
Ando et al.

(10) Patent No.: US 10,523,683 B2
(45) Date of Patent: Dec. 31, 2019

(54) IN-VEHICLE NETWORK SYSTEM

(71) Applicant: TOYOTA JIDOSHA KABUSHIKI KAISHA, Toyota-shi, Aichi-ken (JP)

(72) Inventors: Hiroya Ando, Toyota (JP); Shu Ishizuka, Toyota (JP); Masashi Amesara, Toyota (JP); Yutaka Ueda, Yokkaichi (JP); Toshio Kawamura, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 28 days.

(21) Appl. No.: 15/728,701

(22) Filed: Oct. 10, 2017

(65) Prior Publication Data
US 2018/0131700 A1    May 10, 2018

(30) Foreign Application Priority Data
Nov. 4, 2016    (JP) ................ 2016-216625

(51) Int. Cl.
     *H04L 29/06*      (2006.01)
     *H04L 29/08*      (2006.01)
     (Continued)

(52) U.S. Cl.
     CPC ........ *H04L 63/105* (2013.01); *H04L 63/0281* (2013.01); *H04L 63/162* (2013.01);
     (Continued)

(58) Field of Classification Search
     CPC ..... G06F 21/6218; G06F 21/78; G07C 5/008; G07C 5/0808; G07C 5/085; H04L 12/66; H04L 67/12
     See application file for complete search history.

(56) References Cited

U.S. PATENT DOCUMENTS

2010/0303253 A1* 12/2010 Sakai .................. B60R 25/1001
                                                               381/86
2010/0325639 A1* 12/2010 Isoyama ............. H04L 12/4015
                                                               719/313

(Continued)

FOREIGN PATENT DOCUMENTS

JP          2016-097748 A      5/2016

*Primary Examiner* — Joseph P Hirl
*Assistant Examiner* — Sayed Aresh Beheshti Shirazi
(74) *Attorney, Agent, or Firm* — Hunton Andrews Kurth LLP

(57) ABSTRACT

An in-vehicle network system includes a plurality of first controllers; a plurality of first communication lines, the first communication lines being respectively connected to the first controllers; a connector that connects an external device or a wireless communication device; a connection communication line that is connected to the connector; and a first relay device that relays between the first communication lines and the connection communication line. The first relay device is configured to determine whether a security level in data communication between the first controllers is increased according to a type of the external device or a communication state of the wireless communication device in a state in which the external device or the wireless communication device is connected to the connector, and the first relay device is configured to increase the security level when the first relay device determines that the security level is increased.

13 Claims, 10 Drawing Sheets

(51) Int. Cl.
*H04L 12/40* (2006.01)
*H04L 12/46* (2006.01)
*H04L 12/66* (2006.01)

(52) U.S. Cl.
CPC ............ H04L 63/168 (2013.01); H04L 67/12 (2013.01); *H04L 12/40* (2013.01); *H04L 12/4641* (2013.01); *H04L 12/66* (2013.01)

(56) References Cited

U.S. PATENT DOCUMENTS

| | | | | |
|---|---|---|---|---|
| 2013/0195682 | A1* | 8/2013 | Becher | F04B 7/02 |
| | | | | 417/53 |
| 2014/0297109 | A1* | 10/2014 | Shimomura | H04L 67/125 |
| | | | | 701/36 |
| 2015/0170287 | A1* | 6/2015 | Tirone | G06Q 40/08 |
| | | | | 705/4 |
| 2015/0363606 | A1* | 12/2015 | Nairn | G06F 21/6218 |
| | | | | 701/32.6 |
| 2016/0359893 | A1* | 12/2016 | Kishikawa | H04L 12/40013 |
| 2017/0093866 | A1* | 3/2017 | Ben-Noon | H04L 9/3234 |

* cited by examiner

FIG. 2

GATEWAY ECU 110A

| PORT | CORRESPONDING GROUP |
|---|---|
| 1 | VLAN 130A |
| 2 | VLAN 130A |
| 3 | VLAN 130A |
| 4 | - |
| 5 | VLAN 130A |
| 6 | - |
| 7 | VLAN 130C |
| 8 | - |

GATEWAY ECU 110B

| PORT | CORRESPONDING GROUP |
|---|---|
| 1 | - |
| 2 | VLAN 130A |
| 3 | VLAN 130A |
| 4 | VLAN 130A |
| 5 | VLAN 130B |
| 6 | VLAN 130B |
| 7 | - |
| 8 | VLAN 130A |

FIG. 7A
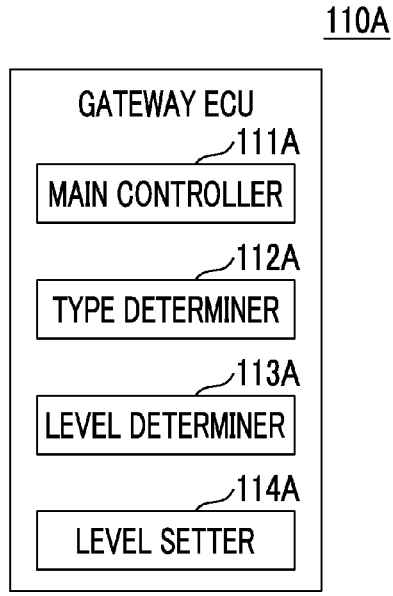
FIG. 7B
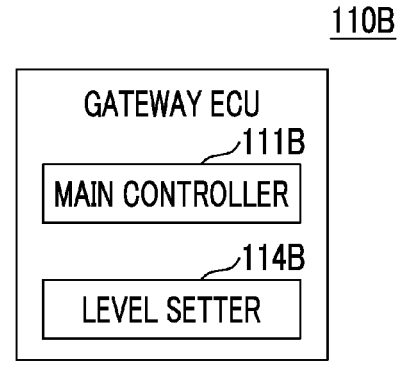
FIG. 8
|  | ID |
|---|---|
| DIAGNOSTIC DEVICE 500 | XXX001 |
| ⋮ | ⋮ |
FIG. 9
|  | DATA COMMUNICATION INSIDE VLAN | DATA COMMUNICATION ACROSS VLAN | DATA COMMUNICATION IN VLAN 130C | ⋯ |
|---|---|---|---|---|
| NORMAL | L2 SWITCH | L3 SWITCH | L7 SWITCH | ⋯ |
| INCREASE | L3 SWITCH | L7 SWITCH | L7 SWITCH | ⋯ |

IN-VEHICLE NETWORK SYSTEM

INCORPORATION BY REFERENCE

The disclosure of Japanese Patent Application No. 2016-216625 filed on Nov. 4, 2016 including the specification, drawings and abstract is incorporated herein by reference in its entirety.

BACKGROUND

1. Technical Field

The disclosure relates to an in-vehicle network system.

2. Description of Related Art

In the related art, there is a driving support device that is connected to a bus (a global communication bus) that is connectable to a device outside a vehicle or a device brought from the outside of the vehicle (hereinafter, an external device) via the interface, which is a bus to which a plurality of control devices or sensors is connected. The driving support device performs driving support control for a vehicle based on information that is supplied from the control devices or sensors via the bus.

Further, the driving support device continues to perform driving support control based on information that is supplied from the control device or sensor that does not fail in a case where any one of the control devices or sensors connected to the bus fails, and sets a security level of data communication via the bus to be higher than in a case where no control devices or sensors fail (for example, Japanese Unexamined Patent Application Publication No. 2016-097748 (JP 2016-097748 A)).

SUMMARY

Incidentally, in a case where the external device is connected to a network built by the bus as described above, the driving support device of the related art does not increase a security level of data communication in the network.

External devices include an external device in which a problem is not caused when connected to a network as described above, and an external device in which a problem may be caused. With the development of information technology, there are various types of external devices, and therefore, the number of external devices in which a problem may be caused is increasing. An external device in which a problem is not caused is, for example, a genuine device approved by a diagnostic device of a vehicle or a manufacturer of a vehicle. Further, the external device in which a problem may be caused is, for example, a non-genuine device that is not approved by the manufacturer of the vehicle.

Thus, when the security level does not increase in a case where the external device in which a problem may be caused is connected to the bus, an in-vehicle network or a control device or the like connected to the network is likely to be affected.

Further, such a problem is not limited to a case where the external device in which a problem may be caused is connected to a bus which is a physical communication line, and a problem may also be caused in a case where the external device is connected to a virtual communication line. Further, such a problem may also be caused in a case where an in-vehicle network is connected to a network outside a vehicle via a wireless communication device, in addition to a case where the external device in which a problem may be caused is physically connected to the communication line.

Further, on the other hand, when the security level of data communication is always high in the entire network, the time needed for communication is likely to increase and a communication speed is likely to decrease.

The disclosure provides an in-vehicle network system in which both of securing a security level and suppressing a decrease in communication speed are achieved in a case where an external device is connected to a communication line or a case where an in-vehicle network is connected to a network outside a vehicle.

An aspect of the disclosure relates to an in-vehicle network system including a plurality of first controllers; a plurality of first communication lines, the first communication lines being respectively connected to the first controllers; a connector that connects an external device or a wireless communication device; a connection communication line that is connected to the connector; and a first relay device that is connected to the first controllers via the first communication lines, is connected to the connector via the connection communication line, and relays between the first communication lines and the connection communication line. The first relay device is configured to determine whether a security level in data communication between the first controllers is increased according to a type of the external device or a communication state of the wireless communication device in a state in which the external device or the wireless communication device is connected to the connector. The first relay device is configured to increase the security level when the first relay device determines that the security level is increased.

According to the aspect of the disclosure, it is possible to determine whether the security level in data communication among the plurality of first controllers is increased according to a type of the external device or a communication state of the wireless communication device. Therefore, in a case where an external device having an influencing on the in-vehicle network system is connected or a case where the wireless communication device is in a communication state, it is possible to increase the security level. In other words, in situations other than such cases, the security level is not increased.

Accordingly, it is possible to provide an in-vehicle network system in which both of securing a security level and suppressing a decrease in communication speed are achieved in a case where an external device is connected to a communication line or a case where an in-vehicle network is connected to a network outside a vehicle.

In the in-vehicle network system according to the aspect, the first relay device may be configured to determine a type of external device, and the first relay device may be configured to determine whether the security level is increased based on the determined type of the external device.

According to the aspect of the disclosure, it is possible to determine the type of external device more reliably in a case where the external device is connected, by determining the type of external device.

Accordingly, the first relay device can more reliably determine whether the security level is increased based on the determined type of external device when the external device is connected, and it is possible to provide an in-vehicle network system in which both of securing a security level and suppressing a decrease in communication speed are achieved.

In the in-vehicle network system according to the aspect, the first relay device may be configured to determine whether the security level in the first communication lines is increased based on the determined type of the external device, an operation state of a vehicle on which the in-vehicle network system is mounted, or a state of an ignition of the vehicle.

According to the aspect of the disclosure, when an external device is connected, the first relay device determines whether or not the security level is increased in consideration of an operation state of the vehicle or the state of the ignition of the vehicle, in addition to the type of external device.

Accordingly, the first relay device can determine whether the security level is increased according to more various situations in consideration of an operation state of the vehicle or the state of the ignition of the vehicle, in addition to the type of external device when the external device is connected, and it is possible to provide an in-vehicle network system in which both of securing a security level and suppressing a decrease in communication speed are achieved.

In the in-vehicle network system according to the aspect, the first relay device may be configured to determine that the security level is increased such that the security level is higher when the operation state of the vehicle is a traveling state than when the operation state of the vehicle is a stopped state in a case where the determined type of the external device corresponds to a target causing the security level to be increased.

According to the aspect of the disclosure, in a case where the determined type of external device corresponds to a target causing the security level to be increased, the security level is set to be higher in a case where an operation state of the vehicle is a traveling state than in a case where the operation state of the vehicle is a stopped state.

Therefore, it is possible to provide the in-vehicle network system in which the security level is secured and a decrease in communication speed is suppressed by increasing the security level in a case where the vehicle is in a traveling state to further improve security of the vehicle in the traveling state.

In the in-vehicle network system according to the aspect, the first relay device may be configured to determine that the security level is maintained when the operation state of the vehicle is the stopped state.

According to the aspect of the disclosure, it is possible to enable communication with large capacity in a case where the operation state of the vehicle is a stopped state by maintaining the security level without increasing the security level in a case where the operation state of the vehicle is the stopped state, and it is possible to provide an in-vehicle network system in which both of securing the security level in a traveling state and suppressing a decrease in communication speed in the stopped state are achieved.

In the in-vehicle network system according to the aspect, the first relay device may be configured to determine that the security level is increased such that the security level is higher when the state of the ignition of the vehicle is on than when the state of the ignition of the vehicle is off or an accessory mode in a case where the determined type of the external device corresponds to a target causing the security level to be increased.

According to the aspect of the disclosure, in a case where the determined type of external device corresponds to a target causing the security level to be increased, the security level is set to be higher in a case where the state of the ignition is on than in a case where the state of the ignition of the vehicle is off or an accessory mode.

Therefore, it is possible to provide the in-vehicle network system in which the security level is secured and a decrease in communication speed is suppressed by increasing the security level in a case where the state of the ignition is on to further improve security of a vehicle in which the state of the ignition is on.

In the in-vehicle network system according to the aspect, the first relay device may be configured to determine that the security level is maintained when the state of the ignition of the vehicle is off or the accessory mode.

According to the aspect of the disclosure, it is possible to enable communication with large capacity in a case where the state of the ignition is off or an accessory mode by maintaining the security level without increasing the security level in the case where the state of the ignition is off or an accessory mode, and it is possible to provide an in-vehicle network system in which both of securing the security level in a case where the state of the ignition is on and suppressing a decrease in communication speed in the case where the state of the ignition is off or an accessory mode are achieved.

In the in-vehicle network system according to the aspect, the first relay device may be configured to determine whether the type of the external device corresponds to an authorized external device, and determine that the security level is increased when the first relay device determines that the external device does not correspond to the authorized external device.

According to the aspect of the disclosure, in a case where an external device is connected, a determination as to whether the security level is increased is made according to whether or not a type of external device is an authorized external device.

Therefore, it is possible to provide the in-vehicle network system in which the security level is secured in a case where an unauthorized external device is connected and a decrease in communication speed is suppressed in a case where an authorized external device is connected.

In the in-vehicle network system according to the aspect, the first relay device may be configured to determine that the security level is maintained when the first relay device determines that the external device corresponds to the authorized external device.

According to the aspect of the disclosure, in a case where an authorized external device is connected, the security level is not changed from the security level before the connection.

Therefore, it is possible to provide the in-vehicle network system in which the security level is secured in a case where an unauthorized external device is connected and a decrease in communication speed is more reliably suppressed in a case where an authorized external device is connected.

In the in-vehicle network system according to the aspect, the first relay device may be configured to increase the security level when the wireless communication device connected to the connector performs wireless communication.

According to the aspect of the disclosure, when the wireless communication device performs communication, the security level is increased. Therefore, it is possible to more effectively protect the in-vehicle network system from a network outside a vehicle such as the Internet that is connected by the wireless communication device.

Therefore, it is possible to provide an in-vehicle network system in which both of securing the security level when the wireless communication device is in communication and suppressing a decrease in communication speed when the wireless communication device is not in communication are achieved.

In the in-vehicle network system according to the aspect, the connector may be a controller that connects the wireless communication device and controls the communication state of the wireless communication device.

According to the aspect of the disclosure, it is possible to easily control, using the controller, the communication state of the wireless communication device that is connected to the in-vehicle network system via the controller serving as the connector, and management of the communication state of the wireless communication device is facilitated.

Therefore, it is possible to provide an in-vehicle network system in which both of securing the security level when the wireless communication device is in communication and suppressing a decrease in communication speed when the wireless communication device is not in communication are further achieved.

In the in-vehicle network system according to the aspect, the first relay device may be a gateway device.

According to the aspect of the disclosure, the gateway device can secure security of data communication at a plurality of security levels.

Therefore, it is possible to provide an in-vehicle network system in which both of securing the security level and suppressing a decrease in communication speed are achieved using the security levels of the gateway device in a case where an external device is connected or when the wireless communication device performs communication.

The in-vehicle network system according to the aspect may further include: a plurality of second controllers; a plurality of second communication lines, the second communication lines being respectively connected to the second controllers; a second relay device that is connected to the second controllers via the second communication lines and relays between the second communication lines; and a third communication line that connects the first relay device and the second relay device. The second relay device may be configured to increase the security level in data communication between the second controllers when the first relay device determines that the security level is increased.

According to the aspect of the disclosure, the second relay device is connected to the first relay device such that the network can be further extended. Further, the setting of the security level of the second communication lines connected to the second relay device depends on the determination result of the first relay device.

Therefore, it is possible to provide an in-vehicle network system in which both of securing a security level and suppressing a decrease in communication speed are achieved in a case where an external device is connected to a communication line or a case where an in-vehicle network is connected to a network outside a vehicle in a network environment including the first relay device and the second relay device.

In the in-vehicle network system according to the aspect, the in-vehicle network system may use an Ethernet protocol as a communication protocol.

In the in-vehicle network system according to the aspect, the in-vehicle network system may include a plurality of virtual local area networks, and may be configured to perform, at a normal time, data communication using a layer 2 switch in an OSI reference model for communication in the same virtual local area network, data communication using a layer 3 switch in the OSI reference model for communication over different virtual local area networks, and data communication using a layer 7 switch in the OSI reference model for communication with a virtual local area network for connection with the external device.

In the in-vehicle network system according to the aspect, the in-vehicle network system may include a plurality of virtual local area networks, and may be configured to perform data communication using a layer 3 switch in an OSI reference model for communication in the same virtual local area network, data communication using a layer 7 switch in the OSI reference model for communication over different virtual local area networks, and data communication using the layer 7 switch in the OSI reference model for communication with a virtual local area network for connection with the external device when the first relay device determines that the security level is increased.

According to the aspect of the disclosure, it is possible to provide an in-vehicle network system in which both of securing a security level and suppressing a decrease in communication speed are achieved in a case where an external device is connected to a communication line or a case where an in-vehicle network is connected to a network outside a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram illustrating data in a table format illustrating assignment of groups of VLANs to which ports of a gateway ECU belong;

FIG. 7A is a diagram illustrating a functional block of the gateway ECU according to the first embodiment;

FIG. 7B is a diagram illustrating a functional block of the gateway ECU according to the first embodiment;

FIG. 8 is a diagram illustrating data in a table format for storing IDs of authorized external devices;

FIG. 9 is a diagram illustrating data in a table format in which an aspect of data communication and a type of switch are associated with each other;

DETAILED DESCRIPTION OF EMBODIMENTS

Hereinafter, embodiments in which an in-vehicle network system of the disclosure is applied will be described.

First Embodiment

Figure 1:
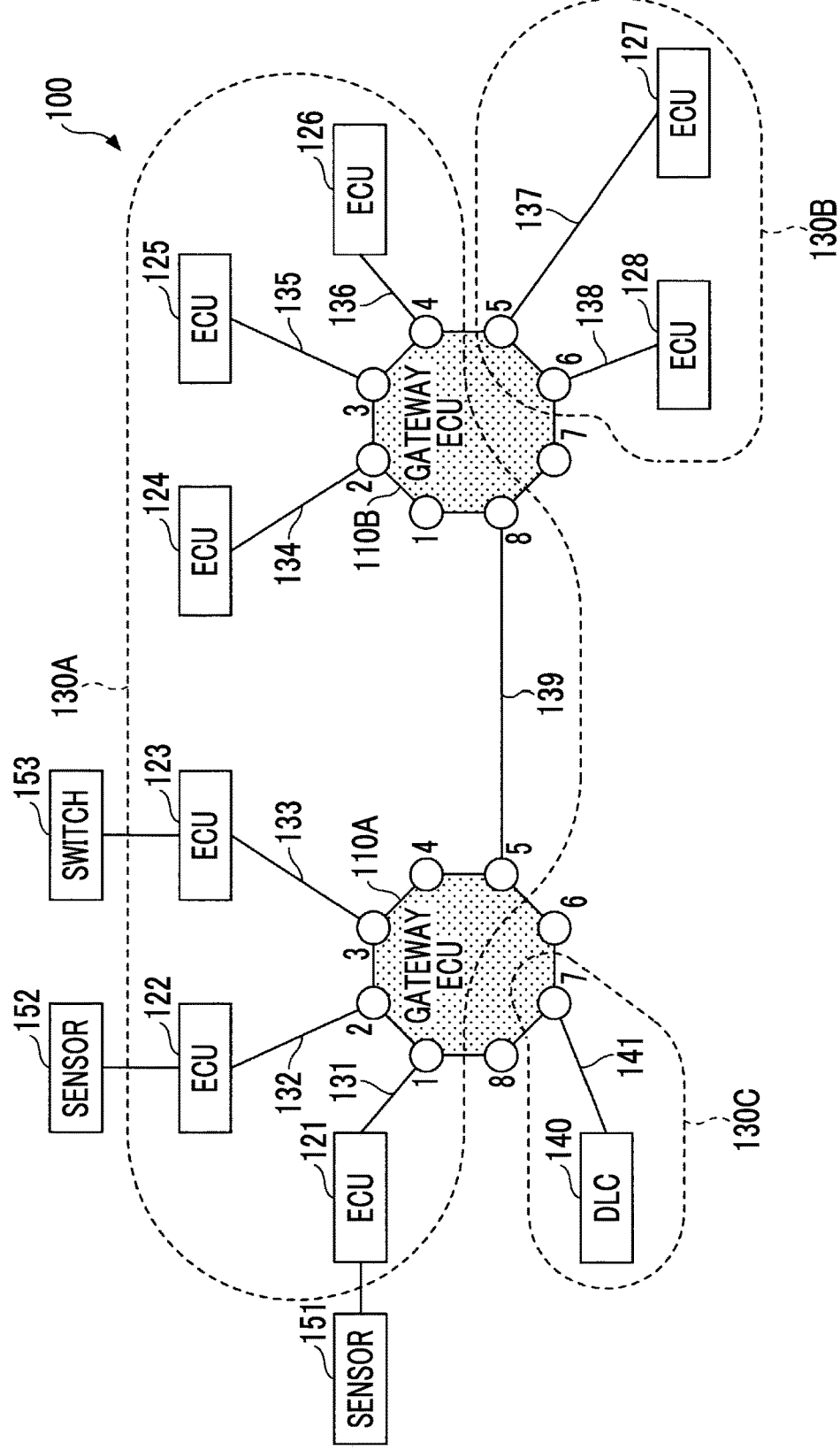
FIG. 1 is a diagram illustrating an in-vehicle network system of a first embodiment, in which the in-vehicle network system is mounted on a vehicle.

FIG. 1 is a diagram illustrating an in-vehicle network system 100 according to a first embodiment. The in-vehicle network system 100 is mounted on a vehicle.

The in-vehicle network system 100 includes relay devices (hereinafter referred to as gateway electronic control units (ECUs)) 110A, 110B, a plurality of controllers (hereinafter referred to as ECUs) 121, 122, 123, 124, 125, 126, 127, 128, communication lines 131, 132, 133, 134, 135, 136, 137, 138, 139, 141, and a data link connector (DLC) 140. Sensors 151, 152 are connected to the ECUs 121, 122, respectively, and a switch 153 is connected to the ECU 123.

The in-vehicle network system 100 uses, for example, an Ethernet protocol as a communication protocol. The communication lines 131, 132, 133, 134, 135, 136, 137, 138, 139, 141 do not indicate physical buses, and are virtual communication lines that build virtual local area networks (VLANs) 130A, 130B, 130C according to the Ethernet protocol.

The VLAN 130A is built by the communication lines 131, 132, 133, 134, 135, 136, 139, and the gateway ECUs 110A, 110B and ECUs 121 to 126 are connected thereto. The VLAN 130B is built by the communication lines 137, 138, and the gateway ECU 110B and the ECUs 127 and 128 are connected thereto. The VLAN 130C is built by the communication line 141, and the gateway ECU 110A and the DLC 140 are connected thereto.

Here, for example, the communication lines 131 to 139 are communication lines corresponding to the standard Ethernet standard, and the communication line 141 is a communication line compliant with the Fast Ethernet standard. The communication lines 131 to 133 are examples of a first communication line, the communication lines 134 to 138 are examples of a second communication line. The communication line 139 is an example of a third communication line, and the communication line 141 is an example of a connection communication line.

Each of the gateway ECUs 110A, 110B is realized by, for example, a computer including a central processing unit (CPU), a random access memory (RAM), a read only memory (ROM), a clock generator, an input and output interface, a communication interface, a transmitter and receiver, and an internal bus.

For example, each of the gateway ECUs 110A, 110B is a relay device for a network that includes eight ports 1 to 8 and relays data input to any one of the ports to any other port. The gateway ECU 110A is an example of a first relay device, and the gateway ECU 110B is an example of a second relay device. The gateway ECU 110A functions as a main gateway device, and the gateway ECU 110B functions as a sub gateway device. An internal configuration of the gateway ECUs 110A, 110B will be described below with reference to FIGS. 7A and 7B.

The ports 1 to 8 of the gateway ECUs 110A, 110B are not physical ports, and are virtual ports. Any number of virtual ports may be provided as long as there are a plurality of virtual ports.

The gateway ECUs 110A, 110B can perform, for example, a data transfer process using a L3 switch or a L2 switch, in addition to a data transfer process using a L7 switch. Each of the gateway ECUs 110A, 110B can perform switching to select the switch to be used. Such gateway ECUs 110A, 110B can also be regarded as hub ECUs.

Here, the L7 switch is a switch that performs a packet transfer process by checking an application-level protocol (usage protocol) information corresponding to layer 7 (application layer) of an Open Systems Interconnection (OSI) reference model. The L7 switch performs switching on a software basis.

Further, the L3 switch is a switch that has a mechanism for distributing a transmission destination address of a packet in layer 3 (network layer) in the OSI reference model, and performs switching on a software basis. In the L3 switch, an Internet Protocol (IP) is used as a transfer protocol. The L3 switch may perform switching on a hardware basis.

Further, the L2 switch is a switch that determines a relay destination with a Media Access Control (MAC) address included as destination information in the data in layer 2 (data link layer) in the OSI reference model, and performs a relay operation. The L2 switch performs switching on a hardware basis.

In the gateway ECU 110A, the ECUs 121, 122, 123 are connected to the ports 1, 2, 3 via the communication lines 131, 132, 133 respectively, the gateway ECU 110B is connected to the port 5 via the communication line 139, and the DLC 140 is connected to the port 7 via the communication line 141.

In the gateway ECU 110B, the ECUs 124, 125, 126 are connected to the ports 2, 3, 4 via the communication lines 134, 135, 136, respectively, the ECUs 127, 128 are connected to the ports 5, 6 via the communication lines 137, 138, respectively, and the gateway ECU 110A is connected to the port 8 via the communication line 139.

The ECUs 121, 122, 123, 124, 125, 126, 127, 128 are examples of controllers that perform various controls of the vehicle. Each of the ECUs 121 to 128 is realized by, for example, a computer including a CPU, a RAM, a ROM, a clock generator, an input and output interface, a communication interface, a transmitter and receiver, and an internal bus.

Each of the ECUs 121 to 128 is any one of various types of ECUs, such as an engine ECU, a brake ECU, a steering ECU, a transmission ECU, a body ECU, a meter ECU, an air conditioner ECU, a Pre-Crash Safety (PCS)-ECU, or a Lane Keeping Assist (LKA).

In FIG. 1, for example, sensors 151, 152 are connected to the ECUs 121, 122, respectively, and the switch 153 is connected to the ECU 123. The sensors 151, 152 are various sensors that are mounted on a vehicle, such as a vehicle speed sensor, a shift position sensor, and a steering angle sensor. Further, the switch is one of various switches connected to the ECU, such as an ignition switch. Such a sensor or switch may also be connected to any one of the ECUs 123 to 128.

In the case of a hybrid vehicle (HV) vehicle, an electric vehicle (EV), and a fuel cell vehicle (FCV), an HV-ECU that controls output of the engine or a driving motor, and an EV-ECU that controls output of the driving motor may be used instead of the engine ECU. Types of ECUs corresponding to the ECUs 121 to 128 differ according to a power source (engine, HV, EV, FCV, or the like) of the vehicle.

The communication lines 131, 132, 133, 134, 135, 136, 137, 138, 139, 141 are virtual communication lines that build the VLANs 130A, 130B, 130C according to the Ethernet protocol, as described above. The gateway ECUs 110A, 110B, the ECUs 121, 122, 123, 124, 125, 126, 127, 128, and the DLC 140 are connected to each other by a physical bus (not illustrated), and the VLANs 130A, 130B, 130C are realized in the physical bus.

The communication lines 131, 132, 133, 134, 135, 136, 139 are included in the VLAN 130A, the communication lines 137, 138 are included in the VLAN 130B, and the communication line 141 is included in the VLAN 130C.

The DLC 140 is a multipin-type connector and is an example of a connector. The DLC 140 is a connector conforming to a standard such as ISO or IEC, and is provided to connect an authorized diagnostic device, an authorized data logger, or the like for a vehicle.

Here, the authorized device is a device authenticated by a vehicle manufacturer, and refers to a genuine device from the manufacturer or a device from an original equipment manufacturer (OEM). Further, an unauthorized device refers to a device that is not the authorized device.

Since the DLC 140 is a connector conforming to a standard such as ISO or IEC, the DLC 140 is not limited to the authorized external device and can connect an unauthorized external device or the like. For example, the DLC 140 can connect a general-purpose data logger or various devices available from retailers, which handle vehicle-related products.

Since the authorized external device is authenticated by a manufacturer, the authorized external device is not likely to adversely affect the in-vehicle network system 100 even when the authorized external device is connected to the DLC 140, whereas when an unauthorized external device is connected to the DLC 140, the unauthorized external device is likely to adversely affect the in-vehicle network system 100.

FIG. 2 is a diagram illustrating a table-format data indicating assignment of a group of the VLANs to which the ports 1 to 8 of the gateway ECUs 110A, 110B belong. Here, the group of the VLANs includes the VLANs 130A, 130B, 130C divided into three groups. The gateway ECUs 110A, 110B determine which group of VLAN each of ports (1-8) belong to.

As shown in the data for the gateway ECU 110A, connection destinations of the port 1, 2, 3, 5 of the gateway ECU 110A are the VLAN 130A, and a connection destination of the port 7 is the VLAN 130C. Further, as shown in the data for the gateway ECU 110B, a connection destination of the ports 2, 3, 4, 8 of the gateway ECU 110B is the VLAN 130A, and a connection destination of the ports 5, 6 is the VLAN 130B.

Further, the ports 4, 6, 8 of the gateway ECU 110A and the ports 1, 7 of the gateway ECU 110B illustrated in FIG. 2 are not assigned to the VLAN (for example, 130A or 130B). However, in a case where the ECU or the like is connected, the ECU or the like is assigned to any one of the VLANs 130A, 130B, 130C by the gateway ECUs 110A, 110B, or is assigned to a new VLAN other than the VLANs 130A, 130B, 130C.

Figure 3:
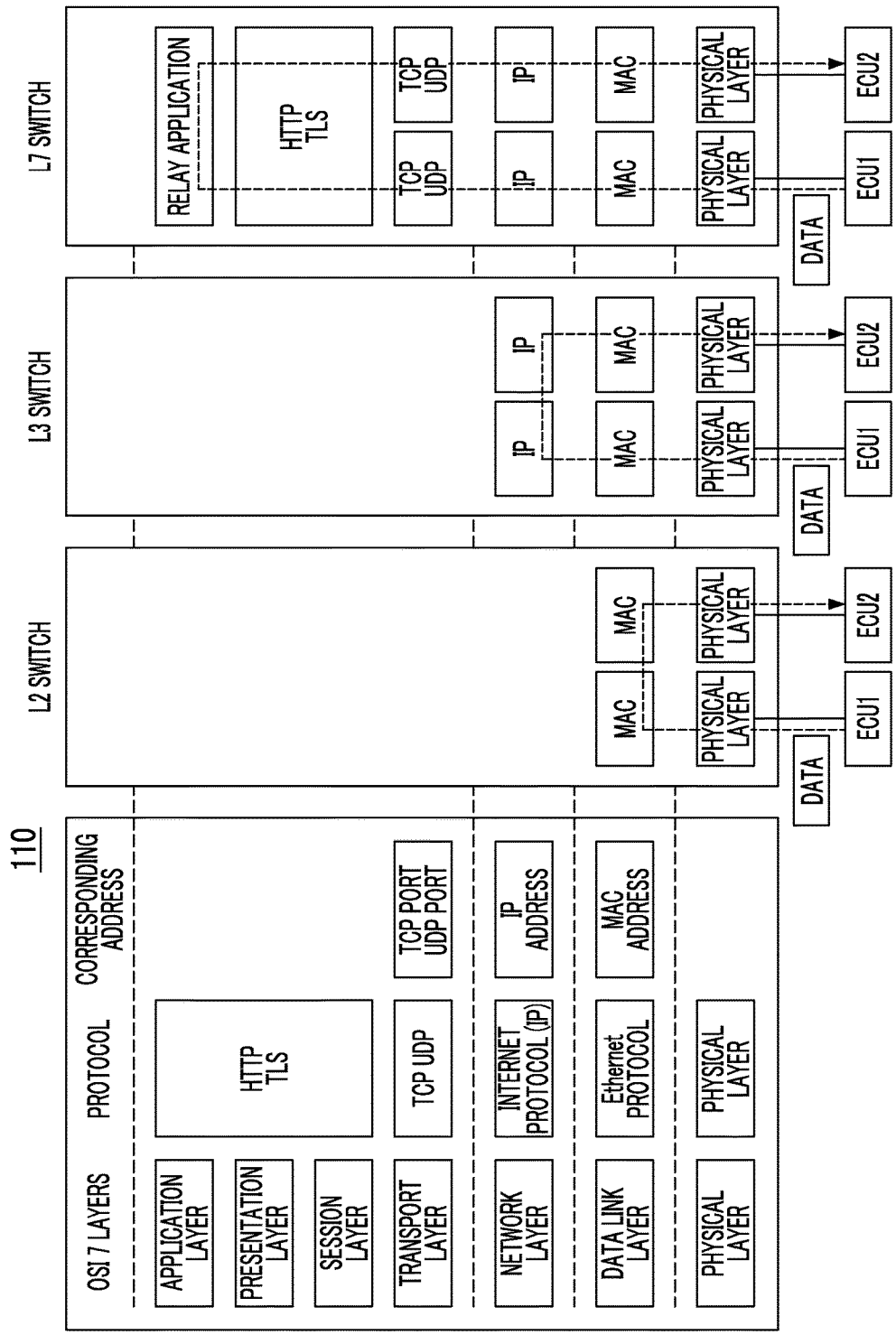
FIG. 3 is a diagram illustrating a functional configuration of a gateway ECU, a layer 2 (L2) switch, a layer 3 (L3) switch, and a layer 7 (L7) switch.

FIG. 3 is a diagram illustrating a functional configuration of the gateway ECU 110, the L2 switch, the L3 switch, and the L7 switch. Since the gateway ECUs 110A, 110B illustrated in FIG. 1 have the same configuration, the gateway ECUs 110A, 110B are illustrated as the gateway ECU 110 in FIG. 3.

Further, for convenience of description, the gateway ECU 110, the L2 switch, the L3 switch, and the L7 switch are illustrated side by side from left to right in FIG. 3.

Further, an aspect in which ECUs 1, 2 are connected to the L2 switch, the L3 switch, and the L7 switch illustrated in FIG. 3, and data is transferred from the ECU 1 to the ECU 2 via the L2 switch, the L3 switch, and the L7 switch will be described. The ECUs 1, 2 are ECUs that are the same as the ECUs 121 to 128.

As illustrated in FIG. 3, the gateway ECU 110 includes a physical layer (layer 1), a data link layer (layer 2), a network layer (layer 3), a transport layer (layer 4), a session layer (layer 5), a presentation layer (layer 6), and an application layer (layer 7), as OSI 7 layers (layers 1 to 7).

Protocols that are used in the respective layer are a physical layer (layer 1), an Ethernet protocol (layer 2), an Internet Protocol (IP) (layer 3), a Transmission Control Protocol (TCP) and User Datagram Protocol (UDP) (layer 4), Hypertext Transfer Protocol (HTTP), a Transport Layer Security (TLS), and the like (layers 5 to 7).

Further, addresses that are used in respective layers are an MAC address (layer 2), an IP address (layer 3), and a TCP port and a UDP port (layer 4).

As illustrated in FIG. 3, in the L2 switch, data output from the ECU 1 is transferred to the ECU 2 via the physical layer corresponding to the ECU 2 over the data link layer corresponding to the ECU 2 by referring to a MAC address in the data link layer from the physical layer, as indicated by a dashed arrow.

As illustrated in FIG. 3, in the L3 switch, data output from the ECU 1 is transferred to the ECU 2 via the data link layer and the physical layer corresponding to the ECU 2 over the network layer corresponding to the ECU 2 by referring to a MAC address in the data link layer from the physical layer and referring to an IP address in the network layer, as indicated by a dashed arrow.

As illustrated in FIG. 3, in the L7 switch, for data output from the ECU 1, a MAC address is referred to in the data link layer from the physical layer, an IP address is referred to in the network layer, and TCP and UDP, and HTTP and TLS are referred to in the transport layer, the session layer, and the presentation layer, as indicated by a dashed arrow. The data is relayed to the ECU 2 by a relay application of the application layer. The data is transferred to the ECU 2 via the presentation layer, the session layer, the transport layer, the network layer, the data link layer, and the physical layer.

As described above, in the L2 switch, since the data is transferred in the data link layer (layer 2), the time needed for a transfer process is shortest (the transfer process is fast), but the security level is lowest among the L2 switch, the L3 switch, and the L7 switch.

Further, in the L7 switch, since the data is transferred in the application layer (layer 7), the time needed for a transfer process is longest, but the security level is highest among the L2 switch, the L3 switch, and the L7 switch.

Further, in the L3 switch, since the data is transferred in the network layer (layer 3), the time needed for a transfer process is shorter next to the time for the L2 switch, but the security level is lower than that of the L7 switch.

The gateway ECUs 110A, 110B can perform switching among the L2 switch, the L3 switch, and the L7 switch.

Next, the security level of the VLANs 130A, 130B, 130C of the in-vehicle network system 100 will be described with reference to FIGS. 4 to 6. The security level of the VLAN 130A, 130B, 130C may be set by any one of the gateway ECUs 110A, 110B, and the security level is assumed to be set by the gateway ECU 110A herein.

Figure 4:
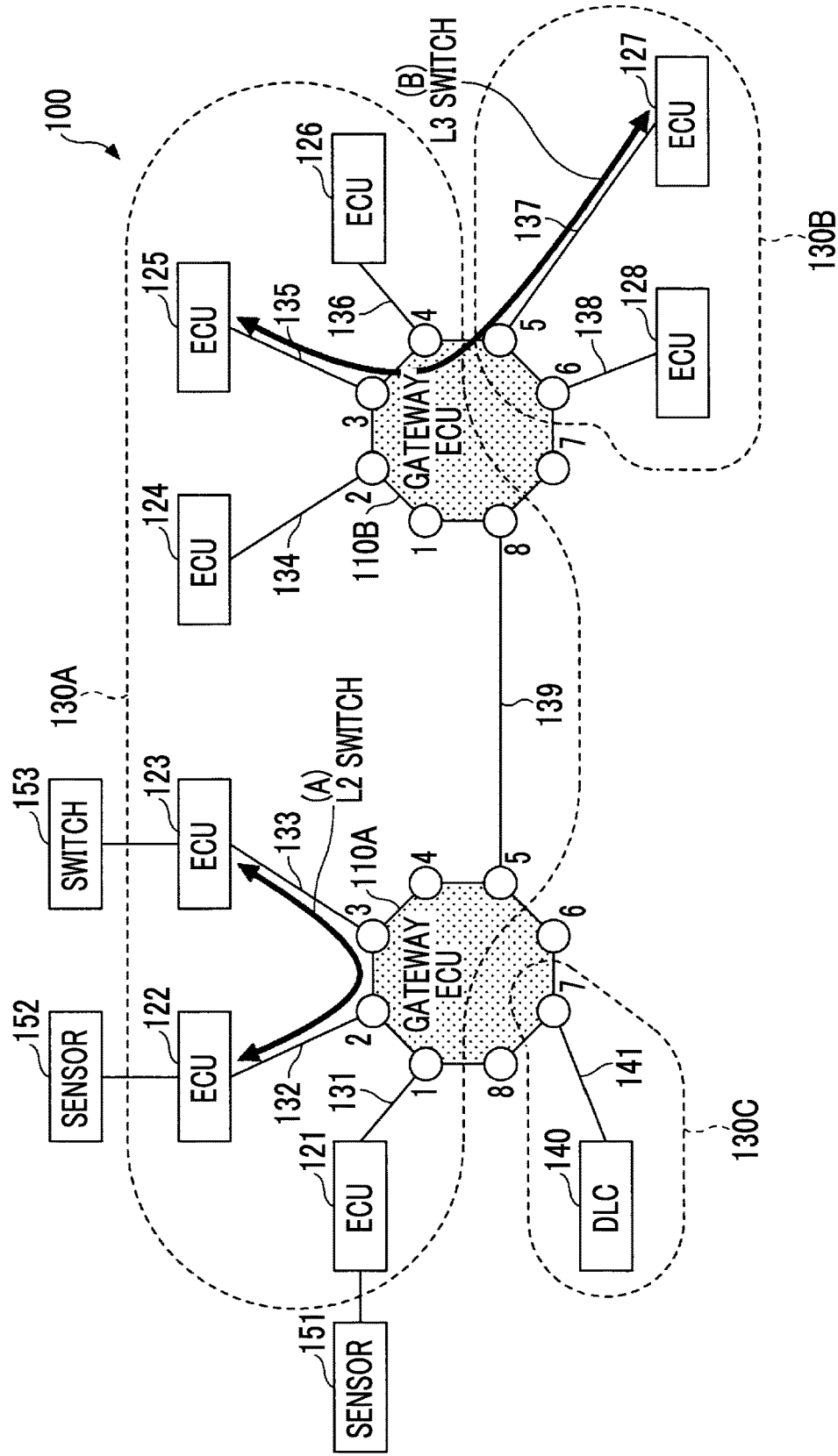
FIG. 4 is a diagram illustrating a relationship between a path for transferred data and an L2 switch, an L3 switch, and an L7 switch in an in-vehicle network system.

FIG. 4 is a diagram illustrating a relationship between a path for data to be transferred and the L2 switch, the L3 switch, and the L7 switch in the in-vehicle network system 100. In FIG. 4, anything is not connected to the DLC 140.

As indicated by an arrow (A), when data is transferred from the ECU 122 to the ECU 123, the data is transferred from the ECU 122 to the ECU 123 via the communication line 132, the gateway ECU 110A, and the communication line 133. Such a path of the data is terminated inside the VLAN 130A and does not pass the outside of the VLAN 130A.

Thus, when the ECU (121 to 128) transfers data in one VLAN (130A or 130B), the L2 switch in which the transfer process is fastest used. This is because a priority is given to a transfer speed relative to the security level in the transfer of data in one VLAN (130A or 130B). Within one VLAN (130A or 130B), data is transferred by the L2 switch across the gateway ECUs 110A, 110B.

As indicated by an arrow (B), when data is transferred from the ECU 125 to the ECU 127, the data is transferred from the ECU 125 to the ECU 127 via the communication line 135, the gateway ECU 110B, and the communication line 137. Such a path of the data is across the VLAN 130A and the VLAN 130B.

Thus, the L3 switch is used when the ECU (121 to 128) transfers the data across the VLAN (130A, 130B).

Figure 5:
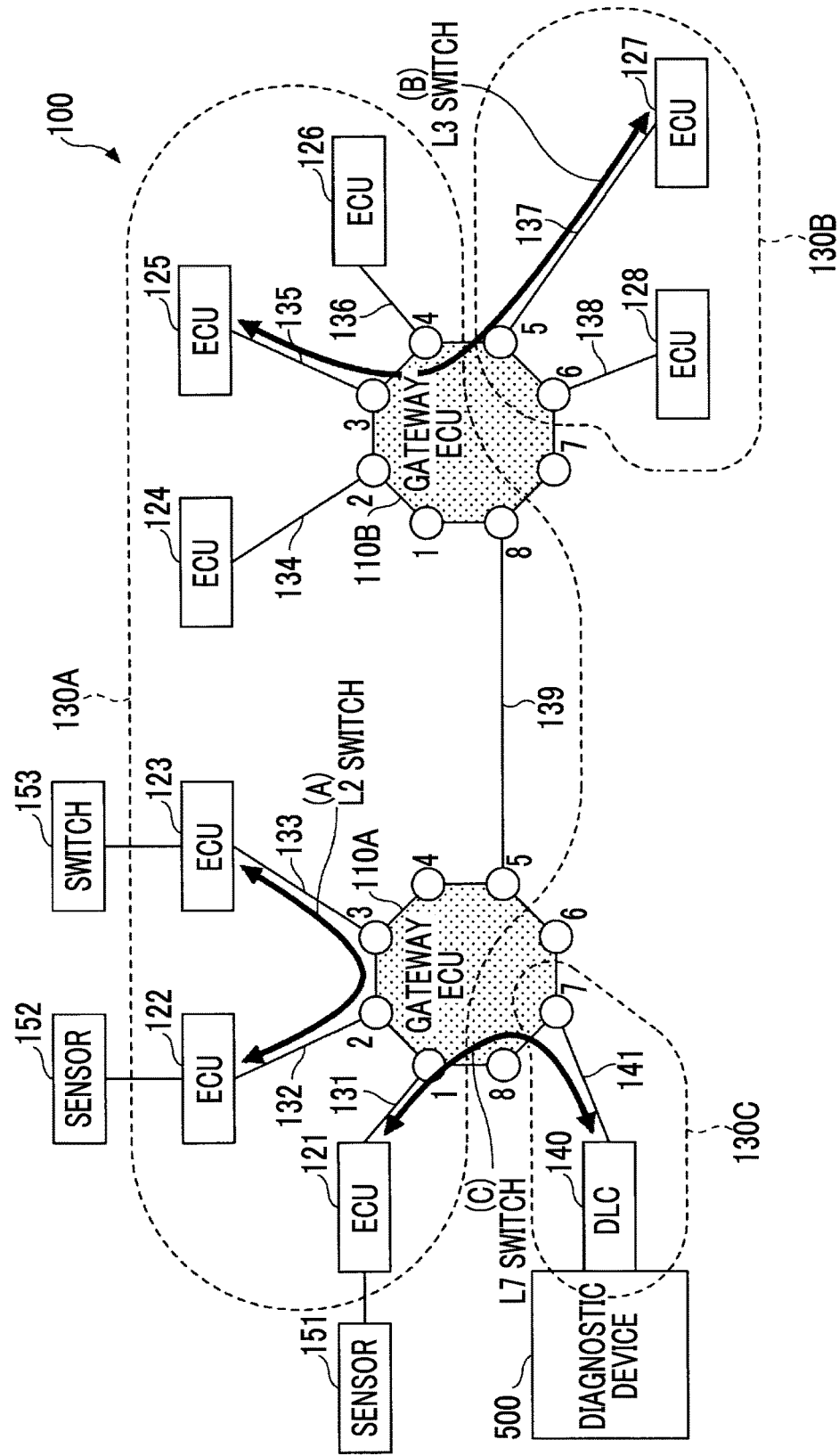
FIG. 5 is a diagram illustrating a relationship between a path for transferred data and an L2 switch, an L3 switch, and an L7 switch in an in-vehicle network system.

FIG. 5 is a diagram illustrating a relationship between a path for data to be transferred and the L2 switch, the L3 switch, and the L7 switch in the in-vehicle network system 100. In FIG. 5, a diagnostic device (DIAGNOSIS TOOL) 500 is connected to the DLC 140. The diagnostic device 500 is an example of an authorized external device.

Even when the diagnostic device 500 that is an authorized external device is connected to the DLC 140, security resistance of the system is considered not to decrease. This is because the authorized external device is a device of which safety has been confirmed in terms of security.

Therefore, in a case where the diagnostic device 500 which is an authorized external device is connected to the DLC 140, when the ECU (121 to 128) transfers data in one VLAN (130A or 130B), the L2 switch in which a transfer process is the fastest is used, as indicated by an arrow (A). In FIG. 5, the arrow (A) is indicated between the ECUs 122, 123. Further, when the ECUs (121 to 128) transfer data across the VLANs (130A, 130B), the L3 switch is used, as indicated by an arrow (B). In FIG. 5, the arrow (B) is indicated between the ECUs 125, 127.

That is, the data transfer process in the ECU (121 to 128) in one VLAN (130A or 130B) and the transfer of data in the ECU (121 to 128) across the VLAN (130A, 130B) are performed in the same manner in a state in which anything is not connected to the DLC 140 (see FIG. 4).

Further, when data is transferred between the ECU 121 and the diagnostic device 500 connected to the DLC 140, the data is transferred between the ECU 121 and the diagnostic device 500 via the communication line 131, the gateway ECU 110A, and the communication line 141, as indicated by an arrow (C). The diagnostic device 500 is an authorized external device, and is an example of an external device (external device (equipment) of a vehicle or a device (equipment)) brought from the outside of the vehicle. That is, in this case, the ECU 121 is connected to the diagnostic device 500 which is an authorized external device.

Thus, when data is transferred between the ECU (121 to 128) and the authorized external device, the L7 switch in which the security level is highest is used. This is because strong security level measures are needed. The L7 switch is also used when the authorized external device other than the diagnostic device 500 is connected to the DLC 140.

Figure 6:
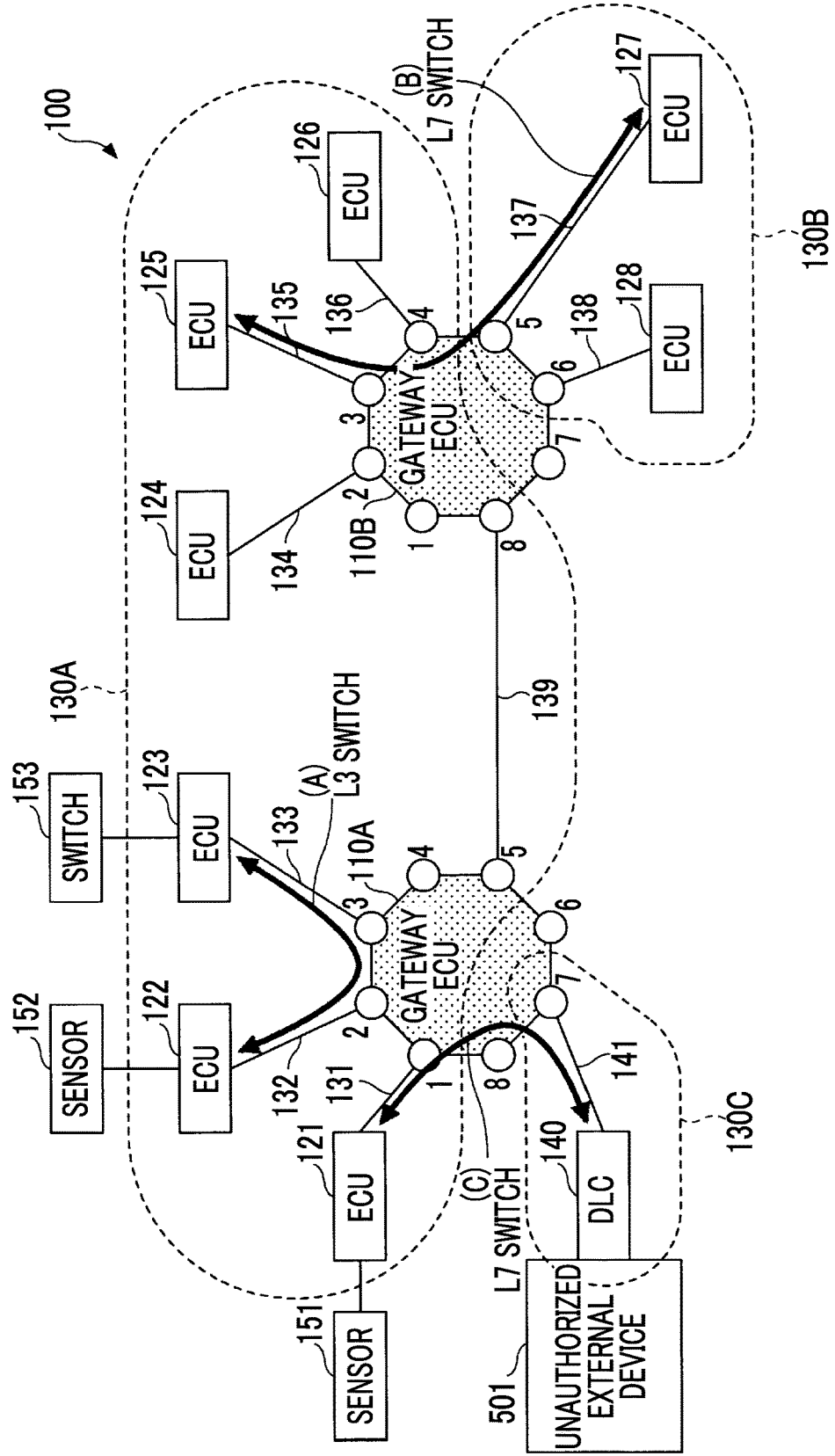
FIG. 6 is a diagram illustrating a relationship between a path for transferred data and an L2 switch, an L3 switch, and an L7 switch in an in-vehicle network system.

FIG. 6 is a diagram illustrating a relationship between a path for data to be transferred and the L2 switch, the L3 switch, and the L7 switch in the in-vehicle network system 100. In FIG. 6, an unauthorized external device 501 is connected to the DLC 140. The unauthorized external device 501 is also an external device.

Thus, when the unauthorized external device 501 is connected to the DLC 140, the in-vehicle network system 100 increases the security level. This is because the unauthorized external device 501 is likely to adversely affect the in-vehicle network system 100, unlike the authorized external device such as the diagnostic device 500.

When the data is transferred inside the VLAN 130A between the ECU 122 and the ECU 123, the L3 switch is used, as indicated by an arrow (A). In the case where the authorized external device (for example, the diagnostic device 500) is connected to the DLC 140 as illustrated by the arrow (A) of FIG. 5, the L2 switch (see FIG. 5) is used when data is transferred within the same VLAN (130A or 130B), whereas in the case where the unauthorized external device 501 is connected to the DLC 140 as illustrated by the arrow (A) of FIG. 6, the L3 switch in which the security level is high is used when data is transferred within the same VLAN (130A or 130B). This is intended to increase the security level according to the unauthorized external device 501.

When the data is transferred between the ECU 125 and ECU 127, the L7 switch is used as indicated by an arrow (B). In the case where the authorized external device (for example, the diagnostic device 500) is connected to the DLC 140, the L3 switch is used when the data is transferred across the VLAN (130A, 130B) as indicated by the arrow (B) of FIG. 5, whereas in a case where the unauthorized external device 501 is connected to the DLC 140, the L7 switch in which the security level is highest is used when the data is transferred across the VLAN (130A, 130B) as indicated by the arrow (B) of FIG. 6. This is intended to increase the security level according to the unauthorized external device 501.

When data is transferred between the ECU 121 and the unauthorized external device 501 connected to the DLC 140, the L7 switch in which the security level is highest is used, as indicated by an arrow (C). This is because security measures at the highest level are needed. The same applies to a case where data is transferred between the ECU 122 to 128 and the unauthorized external device 501 connected to the DLC 140.

FIGS. 7A and 7B are diagrams illustrating functional blocks of the gateway ECUs 110A, 110B according to the first embodiment. FIG. 8 is a diagram illustrating data in a table format for storing an ID of the authorized external device. The data in the table format illustrated in FIG. 8 is stored in, for example, an internal memory such as a ROM of the gateway ECU 110A. The gateway ECU 110A illustrated in FIG. 7A sets the security level of the VLAN 130A, 130B, 130C. Therefore, the gateway ECU 110A will first be described.

The gateway ECU 110A includes a main controller 111A, a type determiner 112A, a level determiner 113A, and a level setter 114A.

The main controller 111A is a controller which controls an entire process of the gateway ECU 110A. The main controller 111A performs a process of the gateway ECU 110A other than the processes that are performed by the type determiner 112A, the level determiner 113A, and the level setter 114A.

The type determiner 112A determines a type of external device that is connected to the DLC 140. The type determiner 112A, for example, collates an ID that is transferred from the external device via the DLC 140 with an ID (XXX001) of the authorized external device illustrated in FIG. 8 and determine the type of external device according to whether or not there is a matching ID. The transfer of the ID from the external device via the DLC 140 is the gateway ECU 110A acquiring the ID via the communication line 141 that has not been used for communication so far.

The external device is an authorized external device when the ID transferred from the external device is present in the data in a table format illustrated in FIG. 8, and the external device is an unauthorized external device when there is no ID. Thus, the type determiner 112A can determine whether the external device connected to the DLC 140 is an authorized external device or an unauthorized external device.

Although the aspect in which the type of external device is determined by performing the collation using the data in the table format illustrated in FIG. 8 has been described by way of example herein, a public key or the like may be used in place of the ID.

Further, when the authorized external device is set to transmit the ID when the authorized external device is connected to the DLC 140, an ID is not transmitted when the unauthorized external device is connected to the DLC 140, and therefore, the unauthorized external device can be determined to have been connected to the DLC 140.

The level determiner 113A determines whether or not to increase a security level of data communication that the ECUs 121 to 128 perform via the communication lines 131 to 139 according to the type of external device that is determined by the type determiner 112A in a state in which the external device is connected to the DLC 140.

The level determiner 113A determines that the security level is maintained when the type of external device that is determined by the type determiner 112A is an authorized external device. Maintaining the security level is holding the security level as a current security level without increasing the security level. The level determiner 113A determines that the security level is increased when the type of external device that is determined by the type determiner 112A is an unauthorized external device.

When the level determiner 113A determines that the security level is maintained, the level setter 114A holds the current security level. Further, when the level determiner 113A determines that the security level is increased, the level setter 114A increases the security level from the current security level. The level setter 114A is an example of a first level setter.

The gateway ECU 110B includes a main controller 111B and a level setter 114B. The gateway ECU 110B is connected to the gateway ECU 110A via the communication line 139 (see FIGS. 1 and 4 to 6), and performs data communication with the gateway ECU 110A. The gateway ECU 110B performs control depending on the gateway ECU 110A for setting of the security level of the VLANs 130A, 130B.

The main controller 111B is a controller which controls an entire process of the gateway ECU 110B, and performs the process of the gateway ECU 110B other than the process that is performed by the level setter 114B.

The level setter 114B performs the same operation as the level setter 114A. That is, the level setter 114B holds a current security level when the level determiner 113A determines that the security level is maintained. Further, the level setter 114B increases the security level from the current security level when the level determiner 113A determines that the security level is increased. The level setter 114B is an example of a second level setter.

FIG. 9 is a diagram illustrating table-format data in which an aspect of data communication and a type of switch are associated with each other. The aspect of data communication is, for example, an aspect in which data communication is performed inside the same VLAN, an aspect in which data communication is performed across a VLAN, an aspect in which data communication is performed inside the VLAN 130C, and indicates a use form of the VLAN when data communication is performed. The type of switch indicates the L2 switch, the L3 switch, and the L7 switch.

Further, "at a normal time" is a case where the level determiner 113A determines that the security level is maintained without being increased or a case where the security level is maintained without being increased in a state in which an external device is not connected to the DLC 140. "At an increasing time" is a case where the level determiner 113A determines that the security level is increased.

Here, for example, the L2 switch is used in data communication that is performed inside the same VLAN at a normal time, and the L3 switch is used at an increasing time. Further, in data communication that is performed across the VLAN at a normal time, the L3 switch is used, and the L7 switch is used at an increasing time. Further, in data communication that is performed inside the VLAN 130C to which the DLC 140 is connected, the L7 switch is used both at a normal time and at an increasing time. In FIG. 9, types of switches in three forms are illustrated, but data in which more forms and the types of switches are associated with each other may be included.

Figure 10:
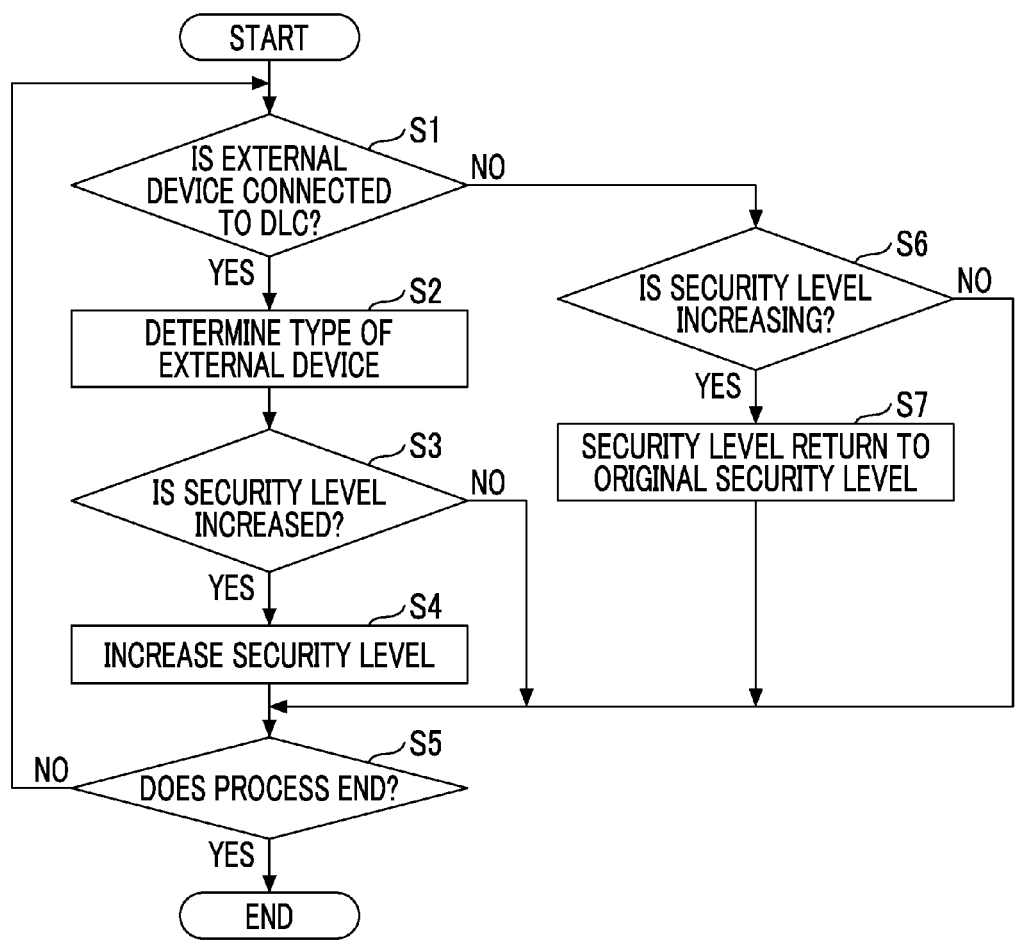
FIG. 10 is a diagram illustrating a flowchart that is executed by the gateway ECU according to the first embodiment.

FIG. 10 is a diagram illustrating a flowchart that is executed by the gateway ECU 110A according to the first embodiment. The gateway ECU 110A executes the process illustrated in FIG. 10 at each predetermined control cycle.

The main controller 111A starts the process (Start). The main controller 111A starts the process, for example, when an ignition switch of a vehicle is turned on.

The type determiner 112A determines whether or not the external device is connected to the DLC 140 (step S1).

The type determiner 112A determines the type of the connected external device when the type determiner 112A determines that the external device is connected to the DLC 140 (S1: YES) (step S2).

The level determiner 113A determines whether or not the security level is increased based on the type of external device determined by the type determiner 112A (step S3). The security level is increased in a case where the type of external device is indicated to be the unauthorized external device 501 (see FIG. 6).

When the level determiner 113A determines that the security level is increased in step S3 (S3: YES), the level setter 114A increases the security level (step S4). Further, when the level setter 114A executes the process of step S4, the level setter 114B also receives an instruction from the level determiner 113A and increases the security level.

Switching from the L2 switch to the L3 switch occurs in order to increase the security level in the data communication when data is transferred in the same VLAN (130A or 130B) through the process of step S4. Similarly, when data is transferred across the VLAN (130A, 130B), switching from the L3 switch to the L7 switch occurs.

The main controller 111A determines whether or not the process ends (step S5). The main controller 111A determines that the process ends, for example, when the ignition switch of the vehicle is turned off.

When the main controller 111A determines that the process ends (S5: YES), the main controller 111A ends a series of processes (END). The main controller 111A ends the process, for example, when the ignition switch of the vehicle is turned off.

Further, when the type determiner 112A determines that the external device is not connected to the DLC 140 in step S1 (S1: NO), the level determiner 113A determines whether or not the security level is increasing (step S6). Cases where the type determiner 112A determines that the external device is not connected to the LDC 140 in step S1 include a case where the external device is not connected to the DLC 140 continuously since the process in a previous control cycle and a case where the external device is disconnected from the DLC 140.

When the level determiner 113A determines that the security level is increasing in step S6 (S6: YES), the level setter 114A causes the security level to return to an original security level (step S7). That is, the level setter 114A decreases the increased security level to the original security level before the increase. This is because an increase in security level is not needed. Further, when the level setter 114A executes the process of step S7, the level setter 114B receives an instruction from the level determiner 113A and decreases the security level.

For example, when the unauthorized external device 501 is disconnected from the DLC 140 after the unauthorized external device 501 is connected to the DLC 140 and the security level is increased, the security level returns to the original security level. When the process of step S7 ends, the main controller 111A causes the flow to proceed to step S5.

Further, when the level determiner 113A determines that the security level is maintained in step S3 (S3: NO), the main controller 111A causes the flow to proceed to step S5.

Further, when the level determiner 113A determines that the security level is not increasing in step S6 (S6: NO), the main controller 111A causes the flow to proceed to step S5.

As described above, in the in-vehicle network system 100 according to the first embodiment, when the unauthorized external device 501 is connected to the DLC 140, switching from data communication using the L2 switch to data communication using the L3 switch occurs, and switching from the data communication using the L3 switch to data communication using the L7 switch occurs in order to increase the security level in the data communication.

By increasing the security level of the data communication in this manner, it is possible to protect the in-vehicle network system 100 from an unexpected situation when the unauthorized external device 501 is connected to the DLC 140 and the unauthorized external device 501 is likely to adversely affect the in-vehicle network system 100.

Further, the communication speed is not decreased and fast data communication can be performed since the security level in the data communication is held (maintained) without being increased in a case where anything is not connected to the DLC 140 and a case where the authorized external device is connected to the DLC 140.

Therefore, according to the first embodiment, it is possible to provide the in-vehicle network system 100 capable of securing the security level and suppressing a decrease in communication speed in a case where the external device is connected to the DLC 140.

The aspect in which the authorized external device connected to the DLC 140 is the diagnostic device 500 has been described above. However, the authorized external device may be a device (such as a server) other than the diagnostic device 500 as long as the authorized external device is a device authenticated by a manufacturer.

Further, the aspect in which a determination as to whether the external device connected to the DLC 140 is an authorized external device or an unauthorized external device is made, and when the external device is the unauthorized external device, the security level is increased has been described above.

However, for example, a determination as to whether or not the vehicle is traveling is made, and when the vehicle is not traveling, the security level may be maintained even when the external device connected to the DLC 140 is either an authorized external device or an unauthorized external device.

When an unauthorized external device is connected to the DLC 140 in a case where the vehicle is traveling, the security level may be increased. This is because a state in which traveling is affected does not occur in a case where the vehicle is not traveling. Further, this is because the traveling may be adversely affected when the unauthorized external device is connected during traveling.

A case where the vehicle is not traveling refers to a state in which the vehicle is stopped. The state in which the vehicle is stopped refers to, for example, a case where a vehicle speed detected by the vehicle speed sensor is zero, or a case where a shift position detected by the shift position sensor is at parking. The state indicating whether or not the vehicle is traveling is an example of an operation state of the vehicle.

Further, in a case where the vehicle is traveling and the unauthorized external device is connected to the DLC 140, the security level may be changed according to the vehicle speed. When the vehicle speed exceeds a certain value, the L7 switch may also be used in the data communication inside the same VLAN.

Further, for example, a determination as to whether the ignition switch of the vehicle is turned on or off is made, and when the ignition switch is turned off, the security level may be maintained even when the external device connected to the DLC 140 is either an authorized external device or an unauthorized external device.

Further, even in a case where the ignition switch is in an accessory mode, and a case where the external device connected to the DLC 140 is either an authorized external device or an unauthorized external device, the security level may also be maintained.

In a case where an unauthorized external device is connected to the DLC 140 when the ignition switch is turned on, the security level may be increased. This is because there may be a case where the vehicle is traveling or a case where the vehicle is before start of traveling during parking when the ignition switch is turned on.

Further, in the case of a vehicle that performs communication in the DCM 600 during parking and updates map data of a navigation system, when the DCM 600 is performing communication during parking of the vehicle, the security level may be increased in order to safely download the map data.

Further, the aspect in which the in-vehicle network system 100 includes the two gateway ECUs 110A, 110B has been described above. However, the in-vehicle network system 100 may be configured to include more gateway ECUs or may be configured to include solely one gateway ECU 110A. Further, although the aspect in which the gateway ECUs 110A, 110B are used as examples of the relay devices (the first relay device and the second relay device) has been described, devices other than the gateway ECUs 110A, 110B may be used as the relay devices as long as the devices can change the security level similar to the gateway ECUs 110A, 110B.

Further, although the aspect in which the DLC 140 is connected to the gateway ECU 110A has been described above, the DLC 140 may be connected to the gateway ECU 110B. In this case, the DLC 140 is connected to the gateway ECU 110A via the gateway ECU 110B and the communication line 139.

Further, the aspect in which the L2 switch is used in a case where data communication inside the same VLAN is performed at a normal time in which the security level is maintained has been described above. Therefore, the L2 switch is used in data communication inside the VLAN 130A across the gateway ECUs 110A, 110B.

However, in the data communication inside the same VLAN, the gateway ECUs 110A, 110B may also use the L3 switch in a portion across the gateway ECUs 110A, 110B such as between the port 5 of the gateway ECU 110A and the port 8 of the gateway ECU 110B. In this case, the L7 switch may be used when the security level is increased.

Further, although the aspect in which the grouping of the VLAN is not changed when the security level is increased has been described above, the grouping of the VLAN may be changed.

For example, a decrease in communication speed in the entire in-vehicle network system 100 may be minimized and faster data communication may be realized by dividing the VLAN and reducing the number of the ECUs to be connected to the VLAN of which the security level is increased.

There are various ways of creating groups when the VLAN is divided. When the VLAN is divided, it is desirable to minimize a decrease in communication speed of the entire in-vehicle network system 100. In such a case, for example, the VLAN 130B illustrated in FIG. 1 may be divided into two VLANs for each of the communication lines 137, 138. Further, when the VLAN is divided, one VLAN may not only be divided, but also a plurality of VLANs may be combined (merged into one) from the viewpoint of reconstruction of groups of all the VLANs included in the in-vehicle network system 100. Further, the group may be reconstructed such that the number of groups of all VLANs included in the in-vehicle network system 100 is reduced.

Second Embodiment

Figure 11:
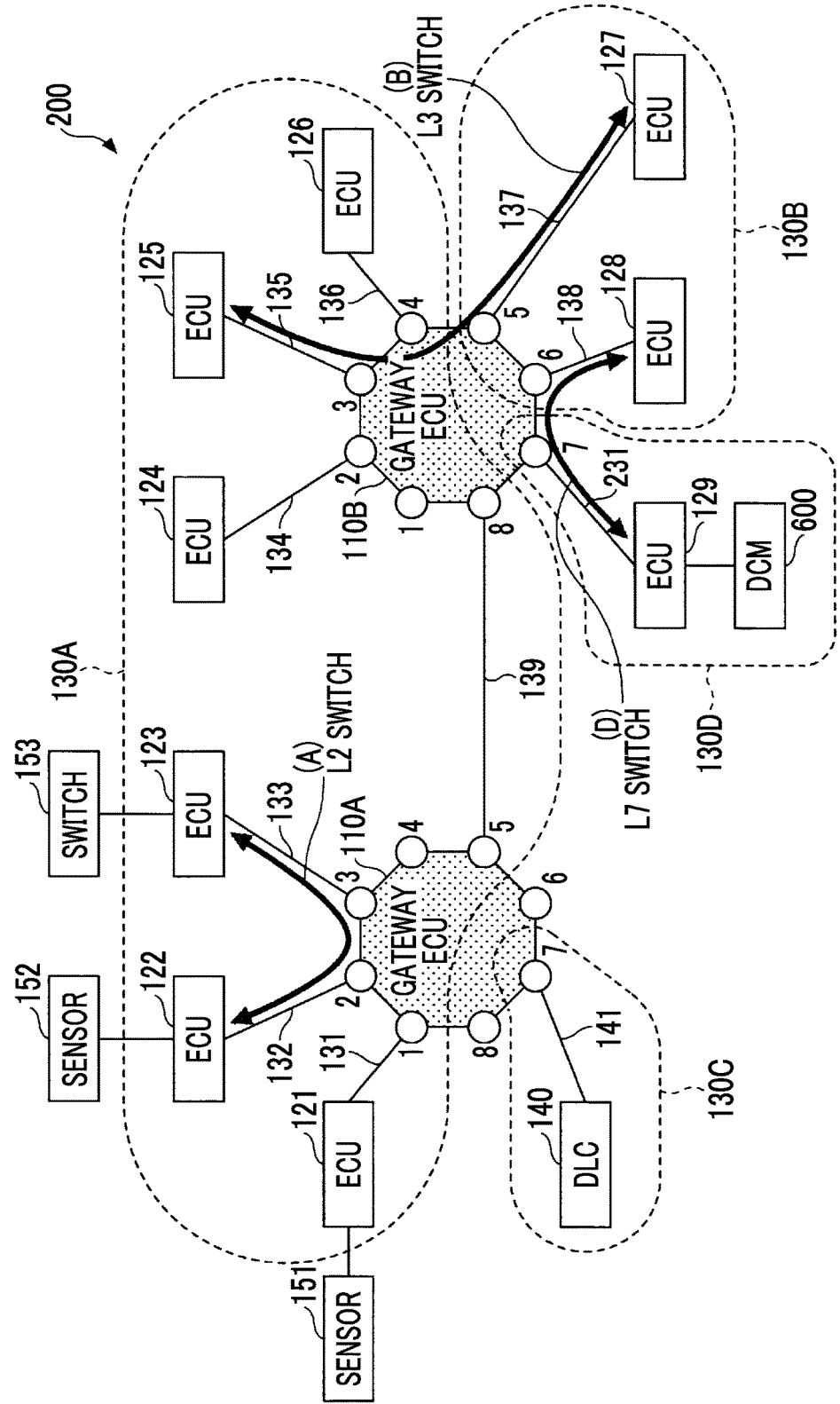
FIG. 11 is a diagram illustrating a relationship between a path for transferred data and an L2 switch, an L3 switch, and an L7 switch in an in-vehicle network system according to a second embodiment.

FIG. 11 is a diagram illustrating a relationship between a path for data to be transferred and an L2 switch, an L3 switch, and an L7 switch in an in-vehicle network system 200 according to a second embodiment.

The in-vehicle network system 200 according to the second embodiment has a configuration obtained by adding an ECU 129, a communication line 231, and a data communication module (DCM) 600 to the in-vehicle network system 100 according to the first embodiment.

The ECU 129 is connected to a port 7 of a gateway ECU 110B via the communication line 231. In the second embodiment, the ECU 129 is used as an example of a connector capable of connecting the DCM 600.

The VLAN 130D is built by the communication line 231, and the gateway ECU 110B and ECU 129 are connected thereto. The communication line 231 is an example of a second communication line. In FIG. 11, anything is not connected to the DLC 140.

Since a configuration other than the above-described configuration in the in-vehicle network system 200 is the same as that of the in-vehicle network system 100 according to the first embodiment, the same components are denoted by the same reference numerals and description thereof is omitted.

The ECU 129 is an ECU for the DCM 600 and performs control of on/off of the communication of the DCM 600 or an input and output process of data between the DCM 600 and the communication line 231. The ECU 129 performing the control of on/off of the communication of the DCM 600 is the ECU 129 controlling a communication state (on/off) of the DCM 600. The ECU 129 may be constituted integrally with the DCM 600.

The DCM 600 is an example of a wireless communication device mounted on a vehicle and performs, for example, wireless communication via a communication line such as Third Generation (3G), Fourth Generation (4G), or Long Term Evolution (LTE). "When communication of the DCM 600 is on" is "when the DCM 600 performs communication", and "when the communication of the DCM 600 is off" is "when the DCM 600 does not perform communication".

In the in-vehicle network system 200, the security level is switched when the DCM 600 is performing communication and when the DCM 600 is not performing communication. Since the security level is maintained when the DCM 600 is not performing the communication, the L2 switch is used when data is transferred inside the same VLAN (130A or 130B) (see, for example, an arrow (A) in FIG. 11), and the L3 switch is used when data is transferred across the VLAN (130A, 130B) (see, for example, an arrow (B) in FIG. 11).

When the DCM 600 is performing communication, the L3 switch is used in a case where the data is transferred inside the VLAN 130A between the ECU 122 and ECU 123, as indicated by the arrow (A). That is, switching from the L2 switch to the L3 switch occurs and the security level is increased. This is intended to increase the security level since the in-vehicle network system 200 is connected to a network outside the vehicle such as the Internet when the DCM 600 performs communication. The same applies to a case where the ECU 121 to the ECU 126 transfers data inside the VLAN 130A and a case where the ECUs 127,128 transfer data inside the VLAN 130B.

Further, when the DCM 600 is performing communication, the switch L7 is used in a case where the data is transferred between the ECU 125 and the ECU 127 across the VLAN (130A, 130B) as indicated by the arrow (B). That is, switching from the L3 switch to the L7 switch occurs and the security level is increased. Similarly, this is intended to increase the security level. Further, the same applies to a case where the ECUs 121 to 126 and the ECUs 127,128 transfer data across the VLAN (130A, 130B).

Further, the L7 switch is used in data communication between the ECU 129 and the ECU 128, as indicated by an arrow (D). This is because security measures at the highest level are needed for connection to a network outside the vehicle. The same applies to a case where the ECU 129 and the ECUs 121 to 127 transfer data.

Figure 12:
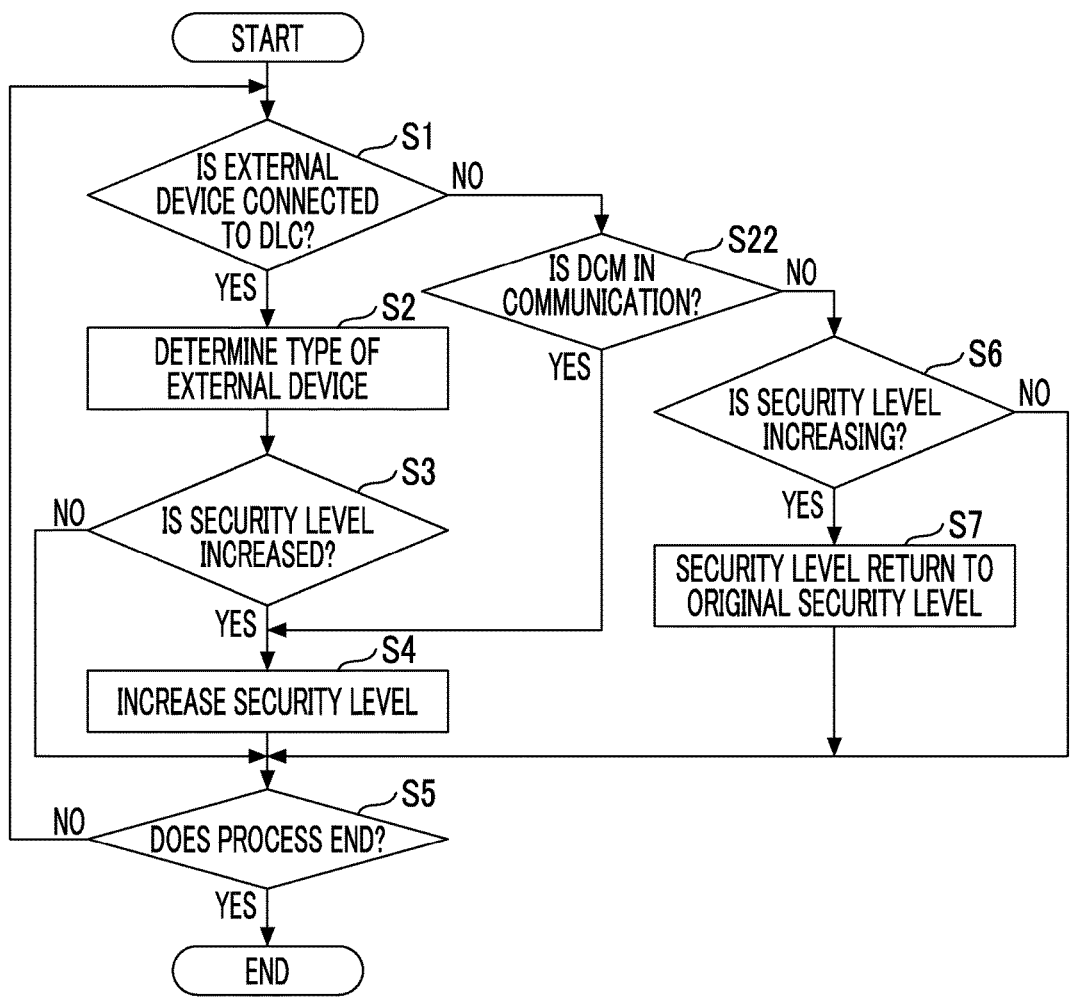
FIG. 12 is a diagram illustrating a flowchart executed by a gateway ECU according to the second embodiment.

FIG. 12 is a diagram illustrating a flowchart that is executed by the gateway ECU 110 according to the second embodiment. A process illustrated in FIG. 12 is obtained by adding a process of step S22 to the process that is executed by the gateway ECU 110 in the first embodiment illustrated in FIG. 10.

When the type determiner 112A determines that an external device is not connected to the DLC 140 in step S1 (S1: NO), the main controller 111A determines whether or not the DCM 600 is in communication (step S22). The main controller 111A determines whether or not the DCM 600 is in communication based on the data received from the ECU 129 via the communication line 231 and the gateway ECU 110B. This is because the ECU 129 controls on/off of the communication of the DCM 600.

When the main controller 111A determines that the DCM 600 is in communication (S22: YES), the main controller 111A causes the flow to proceed to step S4. This is intended to increase the security level, as described with reference to FIG. 11.

When the DCM 600 is in communication in a state in which the external device is not connected to the DLC 140, the level setter 114A increases the security level in step S4. In this case, the security level is increased without performing the determination of the type of external device in the type determiner 112A (step S2) and the determination as to whether or not the security level is increased in the level determiner 113A (step S3). This is because there is no need for the determination of the type of the DCM 600 since the DCM 600 is originally mounted on the vehicle, and the in-vehicle network system 200 is connected to a network outside the vehicle such as the Internet when the DCM 600 is in communication.

On the other hand, when the main controller 111A determines that the DCM 600 is not in communication (S22: NO), the main controller 111A causes the flow to proceed to step S6. This is intended to determine whether the current security level is increased. When the security level is determined to be being increased in step S6, the security level returns to an original security level in step S7. This is because the DCM 600 is not in communication and an external device is also not connected to the DLC 140. When the DCM 600 is determined not to be in communication in step S22 at a current control cycle in a state in which the DCM 600 is determined to be in communication at a previous control cycle and the security level has been increased (S22: NO), the communication of the DCM 600 may be switched from ON to OFF.

As described above, the in-vehicle network system 200 according to the second embodiment performs switching from data communication using the L2 switch to data communications using the L3 switch and performs switching from the data communication using the L3 switch to data communication using the L7 to increase the security level in the data communication according to on/off of the communication of the DCM 600, in addition to whether or not an unauthorized external device 501 is connected to the DLC 140.

By increasing the security level in data communication in this manner, it is possible to protect the in-vehicle network system 200 from an unexpected situation in a case where the DCM 600 is in communication, in addition to the case where the unauthorized external device 501 is connected to the DLC 140.

Further, the communication speed is not decreased and fast data communication can be performed since the security level in the data communication is held (maintained) without being increased in a case where anything is not connected to the DLC 140, a case where the authorized external device is connected to the DLC 140, and a case where communication of the DCM 600 is off.

Therefore, according to the second embodiment, it is possible to provide an in-vehicle network system 200 capable of securing the security level and suppressing a decrease in communication speed in a case where the external device is connected to the DLC 140 and a case where communication of the DCM 600 is on.

Further, although the aspect in which the DCM 600 is connected to the ECU 129 has been described above, a smartphone terminal or a mobile phone terminal of a user may be used instead of the DCM 600. Whether to increase the security level may be determined according to whether or not the smartphone terminal or the mobile phone terminal of the user is in communication.

The in-vehicle network systems according to the exemplary embodiments of the disclosure have been described, but the disclosure is not limited to the specifically disclosed embodiments, and various modifications or changes can be made without departing from the appended claims.

What is claimed is:

1. An in-vehicle network system, comprising:
 a plurality of first controllers;
 a plurality of first communication lines, the plurality of first communication lines being respectively connected to the plurality of first controllers;
 a connector that connects an external device;
 a connection communication line that is connected to the connector; and
 a first relay device that is connected to the plurality of first controllers via the plurality of first communication lines, is connected to the connector via the connection communication line, and relays between the plurality of first communication lines and the connection communication line, wherein:
 the first relay device including a processor and memory for storing data in table format, the data including identification information for the external device;
 in a state in which the external device is connected to the connector, the first relay device is configured to determine a type of external device based on the data stored in the memory of the first relay device, and whether a security level in data communication between the plurality of first controllers is increased according to the determined type of the external device, and
 the first relay device is configured to increase the security level when the first relay device determines that the security level is increased wherein the first relay device is configured to determine whether the security level in the plurality of first communication lines is increased based on the determined type of the external device, an operation state of a vehicle on which the in-vehicle network system is mounted, or a state of an ignition of the vehicle; and
 wherein the in-vehicle network system is configured to select one of a plurality of layer switches corresponding to the determined security level and perform data communication in the plurality of first communication lines using the one of the plurality of layer switches.

2. The in-vehicle network system according to claim 1, wherein the first relay device is configured to determine that the security level is increased and the security level is higher when the operation state of the vehicle is a traveling state than that when the operation state of the vehicle is a stopped state in a case where the determined type of the external device corresponds to a target causing the security level to be increased.

3. The in-vehicle network system according to claim 2, wherein the first relay device is configured to determine that the security level is maintained when the operation state of the vehicle is the stopped state.

4. The in-vehicle network system according to claim 1, wherein the first relay device is configured to determine that the security level is increased and the security level is higher when the state of the ignition of the vehicle is on than that when the state of the ignition of the vehicle is off or an accessory mode in a case where the determined type of the external device corresponds to a target causing the security level to be increased.

5. The in-vehicle network system according to claim 4, wherein the first relay device is configured to determine that the security level is maintained when the state of the ignition of the vehicle is off or the accessory mode.

6. The in-vehicle network system according to claim 1, wherein the first relay device is configured to determine whether the type of the external device corresponds to an authorized external device, and determine that the security level is increased when the first relay device determines that the external device does not correspond to the authorized external device.

7. The in-vehicle network system according to claim 6, wherein the first relay device is configured to determine that the security level is maintained when the first relay device determines that the external device corresponds to the authorized external device.

8. The in-vehicle network system according to claim 1, wherein the first relay device is a gateway device.

9. The in-vehicle network system according to claim 1, further comprising:
a plurality of second controllers;
a plurality of second communication lines, the second communication lines being respectively connected to the second controllers;
a second relay device that is connected to the second controllers via the second communication lines and relays between the second communication lines; and
a third communication line that connects the first relay device and the second relay device,
wherein the second relay device is configured to increase the security level in data communication between the second controllers when the first relay device determines that the security level is increased.

10. The in-vehicle network system according to claim 1, wherein the in-vehicle network system uses an Ethernet protocol as a communication protocol.

11. A vehicle, comprising:
an in-vehicle network system, further comprising:
a plurality of first controllers;
a plurality of first communication lines, the plurality of first communication lines being respectively connected to the plurality of first controllers;
a connector that connects a wireless communication device;
a connection communication line that is connected to the connector; and
a first relay device that is connected to the plurality of first controllers via the plurality of first communication lines, is connected to the connector via the connection communication line, and relays between the plurality of first communication lines and the connection communication line, wherein:
the first relay device is configured to determine whether a security level in data communication between the plurality of first controllers is increased according to a communication state of the wireless communication device in a state in which the wireless communication device is connected to the connector;
the first relay device is configured to increase the security level when the first relay device determines that the security level is increased; and
the first relay device is configured to increase the security level when the wireless communication device connected to the connector performs wireless communication; and
wherein the in-vehicle network system is configured to select one of a plurality of layer switches corresponding to the determined security level and perform data communication in the plurality of first communication lines using the one of the plurality of layer switches.

12. The vehicle according to claim 11, wherein the connector is a controller that connects the wireless communication device and controls the communication state of the wireless communication device.

13. A vehicle, comprising:
an in-vehicle network system, further comprising:
a plurality of first controllers;
a plurality of first communication lines, the plurality of first communication lines being respectively connected to the plurality of first controllers;
a connector that connects an external device;
a connection communication line that is connected to the connector; and
a first relay device that is connected to the plurality of first controllers via the plurality of first communication lines, is connected to the connector via the connection communication line, and relays between the plurality of first communication lines and the connection communication line, wherein:
the first relay device including a processor and memory for storing data in table format, the data including identification information for the external device;
in a state in which the external device is connected to the connector, the first relay device is configured to determine a type of external device based on the data stored in the memory of the first relay device, and whether a security level in data communication between the plurality of first controllers is increased according to the determined type of the external device; and
the first relay device is configured to determine whether a security level in data communication between the plurality of first controllers is increased according to a type of the external device or a communication state of the wireless communication device in a state in which the external device or the wireless communication device is connected to the connector; and
the first relay device is configured to increase the security level when the first relay device determines that the security level is increased,
wherein the in-vehicle network system uses an Ethernet protocol as a communication protocol,
wherein the in-vehicle network system includes a plurality of virtual local area networks, and is configured to perform, at a normal time, data communication using a layer 2 switch in an Open Systems Interconnection (OSI) reference model for communication in same virtual local area network, data communication using a layer 3 switch in the OSI reference model for communication over different virtual local area networks, and data communication using a layer 7 switch in the OSI reference model for communication with a virtual local area network for connection with the external device, or includes a plurality of virtual local area networks, and is configured to perform data communication using a layer 3 switch in an OSI reference model for communication in the same virtual local area network, data communication using a layer 7 switch in the OSI reference model for communication over different virtual local area networks, and data communication using the layer 7 switch in the OSI reference model for communication with a virtual local area network for connection with the external device when the first relay device determines that the security level is increased.

* * * * *